United States Patent
Dang et al.

(10) Patent No.: US 11,386,591 B2
(45) Date of Patent: Jul. 12, 2022

(54) RECONSTRUCTION METHOD FOR MOTION COMPENSATED HIGH QUALITY 4D-CBCT IMAGE BASED ON BILATERAL FILTERING

(71) Applicant: The First Affiliated Hospital of Chongqing Medical University, Chongqing (CN)

(72) Inventors: Jun Dang, Chongqing (CN); Tao Zhang, Chongqing (CN); Xiaopin Chen, Chongqing (CN)

(73) Assignee: The First Affiliated Hospital of Chongqing Medical University, Chongqing (CN)

( * ) Notice: Subject to any disclaimer, the term of this patent is extended or adjusted under 35 U.S.C. 154(b) by 0 days.

(21) Appl. No.: 17/276,938

(22) PCT Filed: Jun. 17, 2020

(86) PCT No.: PCT/CN2020/096443
§ 371 (c)(1),
(2) Date: Mar. 17, 2021

(87) PCT Pub. No.: WO2021/042807
PCT Pub. Date: Mar. 11, 2021

(65) Prior Publication Data
US 2021/0248790 A1      Aug. 12, 2021

(30) Foreign Application Priority Data

Sep. 5, 2019  (CN) .......................... 201910837231.0

(51) Int. Cl.
*G06T 11/00*      (2006.01)
(52) U.S. Cl.
CPC ........ *G06T 11/005* (2013.01); *G06T 2210/41* (2013.01); *G06T 2211/424* (2013.01)

(58) Field of Classification Search
CPC ............... G06T 11/005; G06T 2210/41; G06T 2211/424
See application file for complete search history.

(56) References Cited

U.S. PATENT DOCUMENTS

2015/0221104 A1    8/2015  Ra et al.

FOREIGN PATENT DOCUMENTS

| CN | 104361568 A | 2/2015 |
| CN | 107886478 A | 4/2018 |
| CN | 110570489 A | 12/2019 |

OTHER PUBLICATIONS

"Simultaneous motion estimation and image reconstruction (SMEIR) for 4D cone-beam CT" Wang et al. (Year: 2013).*

(Continued)

*Primary Examiner* — Vu Le
*Assistant Examiner* — Winta Gebreslassie
(74) *Attorney, Agent, or Firm* — Todd R. Fronek; Larkin Hoffman Daly & Lindgren, Ltd.

(57) ABSTRACT

The present disclosure provides a reconstruction method for motion compensated high quality four-dimensional (4D)-Cone Beam Computed Tomography (CBCT) image based on bilateral filtering, including the following steps: step 1, building a motion compensated three-dimensional (3D)-CBCT reconstruction model based on a simultaneous algebraic reconstruction technique (SART) to reconstruct a high quality CBCT image of a reference phase (phase 0%); step 2, creating an iterative optimization procedure and estimating a 4D Deformable Vector Field (DVF) model between phase 0% and other 4D phase images, thereby obtaining an exact 4D-DVF inclusive of an inverse sliding motion on a surface of a locomotive organ; and step 3, successively deforming the high quality phase 0% image in accordance with an optimized 4D-DVF to obtain a sequence of final high quality 4D-CBCT images. This method permits exact (Continued)

reconstruction of high quality 4D-CBCT images without changing the hardware structure of an existing linear accelerator for conventional radiotherapy.

3 Claims, 4 Drawing Sheets

(56) References Cited

OTHER PUBLICATIONS

International Search Report and Written Opinion, PCT Application No. PCT/CN2020/096443, dated Aug. 27, 2020, 5 pages.
Dang, Jun, et al., "Simultaneous 4D-CBCT Reconstruction With Sliding Motion Constraint", Medical Physics, vol. 43, No. 10, 2016, pp. 5453-5463.
CN First Office Action, App. No. 201910837231.0, 7 pages.

* cited by examiner

RECONSTRUCTION METHOD FOR MOTION COMPENSATED HIGH QUALITY 4D-CBCT IMAGE BASED ON BILATERAL FILTERING

TECHNICAL FIELD

The present disclosure is directed at precise image-guided radiation therapy during Stereotactic Body Radiation Therapy (SBRT) for cancerous locomotive organs (such as cancerous lung).

BACKGROUND

SBRT has been widely used for lung cancer, and has been proved to have a better therapeutic effect than traditional Intensity Modulated Radiation Therapy (IMRT). Furthermore, during SBRT, beam emission is effected in a non-Flattening Filter Free (FFF) beam mode based on a small field (having a field size less than 5*5 cm). The beams thus provided have much higher center dose rate and intensity than intensity-modulated beams with a flattening filter, as shown in FIG. 1. Therefore, it is of great significance to realize precise positioning of FFF beams during SBRT to ensure that the beams accurately strike cancerous lesions while protecting the surrounding normal tissues to the greatest extent, thereby achieving the safety of SBRT.

This requires a doctor to accurately confirm, by means of image guide, whether respiratory motions in the lung cancer area in a patient at the time of treatment are consistent with a range of movement in the radiotherapy target volume in an SBRT plan before performing SBRT on the patient with an emitted beam. At present, Cone Beam Computed Tomography (CBCT) integrated in a linear accelerator is only capable of three-dimensional (3D) imaging, which lacks the function of four-dimensional (4D) dynamic imaging for locomotive organs.

An existing CBCT system integrated in the frame of a linear accelerator can only realize the traditional 3D-CBCT imaging function. Therefore, CBCT can only be used in setup verification prior to radiotherapy at present. While a current international main radiotherapy accelerator manufacturer has proposed a 4D-CBCT imaging function module based on an analytical method, the image quality needs to be further improved due to poor imaging effect of such imaging function module. Currently, although the recently developed accelerator CBCT has provided the 4D-CBCT imaging function, the imaging method used may result in many artifacts and hence poor image quality. For some lung cancer scenarios in need of precise positioning guided SBRT, good monitoring guidance is impossible.

SUMMARY

In view of the disadvantages mentioned in the prior art, the present disclosure provides a reconstruction method for motion compensated high quality 4D-CBCT image based on bilateral filtering, with the operation of bilateral filtering being implemented in an iterative 4D-Deformable Vector Field (DVF) optimization procedure.

To solve the above-mentioned technical problems, the present disclosure adopts the following technical solution:

A reconstruction method for motion compensated high quality 4D-CBCT image based on bilateral filtering allows for exact modeling reconstruction for an inverse sliding motion on a surface of a locomotive organ and includes the following steps:

step 1, building a motion compensated 3D-CBCT reconstruction model based on a modified Simultaneous Algebraic Reconstruction Technique (SART) to reconstruct a high quality CBCT image of a reference phase, the reference phase being phase 0%;

step 2, creating an iterative optimization procedure and estimating a 4D image DVF model between phase 0% and other 4D phase images, thereby obtaining an exact 4D-DVF inclusive of the inverse sliding motion on the surface of the locomotive organ; and step 3, successively deforming the high quality phase 0% image in accordance with an optimized 4D-DVF to obtain a sequence of final high quality 4D-CBCT images.

In one embodiment of the present disclosure, during modeling in step 1, the optimized 4D-DVF between phase 0% and other 4D phases may be substituted into the SART reconstruction procedure to obtain an improved motion compensated SART algorithm, thereby obtaining a high quality phase 0% initial image based on all 4D projections; and a mathematical model of motion compensated SART is described below:

letting $p^t=(p_1^t, p_2^t, \ldots, p_I^t)$ represent a logarithmically compressed line integral of 4D-CBCT projections of phase t and $\mu^t=(\mu_1^t, \mu_2^t, \ldots, \mu_J^t)$ represent an attenuation coefficient for a phase t image; and the mathematical model of motion compensated SART is expressed as equation (1):

$$\mu_j^{0,(k+1)} = \mu_j^{0,(k)} + \frac{\sum_{jn} d_{jn}^{t\to 0} \sum_i \left[ a_{in} \frac{p_i^t - \sum_n a_{in}\mu_n^{t,(k)}}{\sum_{n=1}^J a_{in}} \right]}{\sum_i a_{in}} \quad (1)$$

where k is the number of iterations; j is a voxel index for the phase 0% image; n is a voxel index for the phase t image; $a_{in}$ is an intersection length of projection ray I with image voxel n, which is obtained by Digitally Reconstructed Radiograph (DRR); $d_{jn}^{t\to 0}$ represents an inverse DVF for deforming the phase t image to phase 0; introducing DVF reflects the idea of motion compensation; and a phase % initial image $\mu_j^{0,(0)}$ is obtained via Total Variation (TV) minimization reconstruction.

According to the present disclosure, DVF at each 4D phase may be optimized by an algorithm that generates the optimized DVF by registration 1) measured projections of the phase and 2) simulated forward projection of a reference phase 0% image deformed to the phase. An energy function used in DVF optimization by projection registration is as follows:

$$f_1(v^{0\to t})=\|p^t-A\mu^0(x+v^{0\to t})\|^2_2+\beta\varphi(v^{0\to t})$$

$$f_2(v^{t\to 0})=\|p^0-A\mu^t(x+v^{t\to 0})\|^2_2+\beta\varphi(v^{t\to 0})$$

$$s.t. v^{0\to t}(x+v^{t\to 0})+v^{t\to 0}=v^{t\to 0}(x+v^{0\to t})+v^{0\to t}=0 \quad (2)$$

where $f_1$ and $f_2$ represent symmetric inverse continuous energy functions, with the superscript 0 representing phase 0% and the superscript t represents other phase t; A is a matrix for providing a forward projection of the deformed phase 0% image; $v^{0\to t}$ represents forward DVF; $v^{t\to 0}$ represents inverse DVF; $\|p^t-A\mu^0(x+v^{0\to t})\|^2_2$ and $\|p^0-A\mu^t(x+v^{t\to 0})\|^2_2$ are data fidelity terms; $\varphi(v^{0\to t})$ and $\varphi(v^{t\to 0})$ are corresponding normalization terms; the inverse continuity of DVF is guaranteed by the third row in the above mentioned equation (2); the smoothness of the smoothing term is controlled by β; and taking modeling of the inverse sliding motion on the the locomotive organ into consideration, φ(v) is defined as:

$$\varphi(v) = \sum_{v \in R^3} \sum_{i=1}^{3} \sum_{j=1, y_j \in N(x_j)}^{3} \left( G_x(x_j, y_j, \sigma_x^2) \cdot G_\mu(\mu^t(x_j), \mu^t(y_j), \sigma_\mu^2) \cdot G_{v_i}(v_i(x_j), v_i(y_j), \sigma_v^2) \left(\frac{\partial v_i}{\partial x_j}\right)^2 \right) \quad (3)$$

with $$G_x(x_j, y_j, \sigma_x^2) = \exp\left(-\frac{(x_j - y_j)^T(x_j - y_j)}{2\sigma_x^2}\right)$$

$$G_\mu(\mu^t(x_j), \mu^t(y_j), \sigma_\mu^2) = \exp\left(-\frac{\|\mu^t(x_j) - \mu^t(y_j)\|^2}{2\sigma_\mu^2}\right)$$

$$G_{v_i}(v_i(x_j), v_i(y_j), \sigma_v^2) = \exp\left(-\frac{(v_i(x_j) - v_i(y_j))^T(v_i(x_j) - v_i(y_j))}{2\sigma_v^2}\right)$$

$G_x$ is the Gaussian kernel on the spatial domain with the variance of $\sigma_x^2$; $G_\mu$ is another image domain based Gaussian kernel with the variance of $\sigma_\mu^2$; $G_v$ is the DVF domain Gaussian kernel with the variance of $\varphi_v^2$. '$x_j$' is the kernel's center voxel location, and '$y_j$' are the neighborhood voxel locations within $N(x_j)$.

$$\frac{\partial v_i}{\partial x_j}$$

has the same meaning that has been explained in equation (4). For implementation, the gradient $\nabla \varphi(v)|_v$ is calculated within the 3×3×3 neighborhood surrounding each voxel of interest. The gradient of φ(v) is given by:

$$\nabla \varphi(v) = \sum_{v \in R^3} \sum_{i=1}^{3} \sum_{j=1, y_j \in N(x_j)}^{3} (G_x(x_j, y_j, \sigma_x^2) \cdot G_\mu(\mu^t(x_j), \mu^t(y_j), \sigma_\mu^2) \cdot G_v(v_i(x_j), v_i(y_j), \sigma_v^2)(v_i(x_j) - v_i(y_j))) \quad (4)$$

During specific calculation, respective spatial voxel positions/voxel values and corresponding DVF voxels may be substituted into formula (4), and a difference between the central voxel and a neighborhood thereof in the DVF sub-kernel may be calculated.

According to the present disclosure, on the basis of the high quality phase 0% CBCT image and the optimized 4D-DVF thus obtained, a sequence of final high quality 4D-CBCT images is obtainable by deforming the phase 0% image; and the mathematical description of this procedure is presented below:

$$\mu_n^{t,(k)} = \sum_j d_{jn}^{0 \to t} \mu_j^{0,(k)} \quad (5)$$

where $\mu_n^{t,(k)}$ represents that a phase t CBCT image is obtainable by deforming $\mu_j^{0,(k)}$ using 4D-DVFs, i.e., $d_{jn}^{0 \to t}$.

For the sake of follow-up contrast testing, here, φ(v) in the context of modeling without consideration of bilateral filtering and sliding motion is also defined as follows:

$$\varphi(v) = \sum_{v \in R^3} \sum_{i=1}^{3} \sum_{j=1}^{3} \left(\frac{\partial v_i}{\partial x_j}\right)^2 \quad (6)$$

The smoothing term in formula (6) is very simple, i.e., simply isotropic homogeneous smoothing in each direction of Cartesian coordinate system. The modeling for the inverse sliding motion on the surface of the locomotive organ may be completely omitted from such operation.

The present disclosure provides a method for motion compensated 4D-CBCT image reconstruction that can provide high quality images. The method enables reconstruction of a high quality CBCT image of an initial reference phase using projections of all 4D phases by accurate motion compensation. Subsequently, optimization of DVF between the reference phase and the other 4D phases is carried out to obtain the optimized 4D-DVF. Finally, the high quality image at the initial reference phase is deformed using the optimized 4D-DVF to obtain a sequence of high quality 4D-CBCT images. During the estimation of 4D-DVF, DVF is subjected to bilateral filtering, so that the information of locally non-uniform inverse sliding motion occurring on the surface of the locomotive organ, in addition to globally uniform motion information in the entire thoracic cavity, can be obtained as well. This helps to further improve the accuracy of 4D-DVF estimation. Accordingly, a sequence of accurate reconstructed 4D-CBCT images can be obtained.

Compared with the prior art, the present disclosure has the following beneficial effects:

1. The method of the present disclosure enables not only estimation of globally uniform motion of the locomotive organ but also accurate estimation of locally motion on the surface of the locomotive organ.

2. A sequence of high quality 4D-CBCT images can be obtained entirely by the method of the present disclosure without any change to the accelerator-integrated CBCT imaging hardware system and the clinical scan protocol. Such high quality 4D-CBCT images obtained by the method of the present disclosure can provide a 4D tumor motion trajectory with merely a submillimeter-level error for SBRT of lung cancer. Thus, the safety of lung cancer treatment using SBRT and the accuracy of tumor tracking can be significantly enhanced. The method can supply a gap in current radiotherapy accelerator-integrated CBCT about failing to high quality 4D-CBCT imaging and hence can be used as an effective image guide means in lung cancer treatment using SBRT.

DETAILED DESCRIPTION

Figure 1:
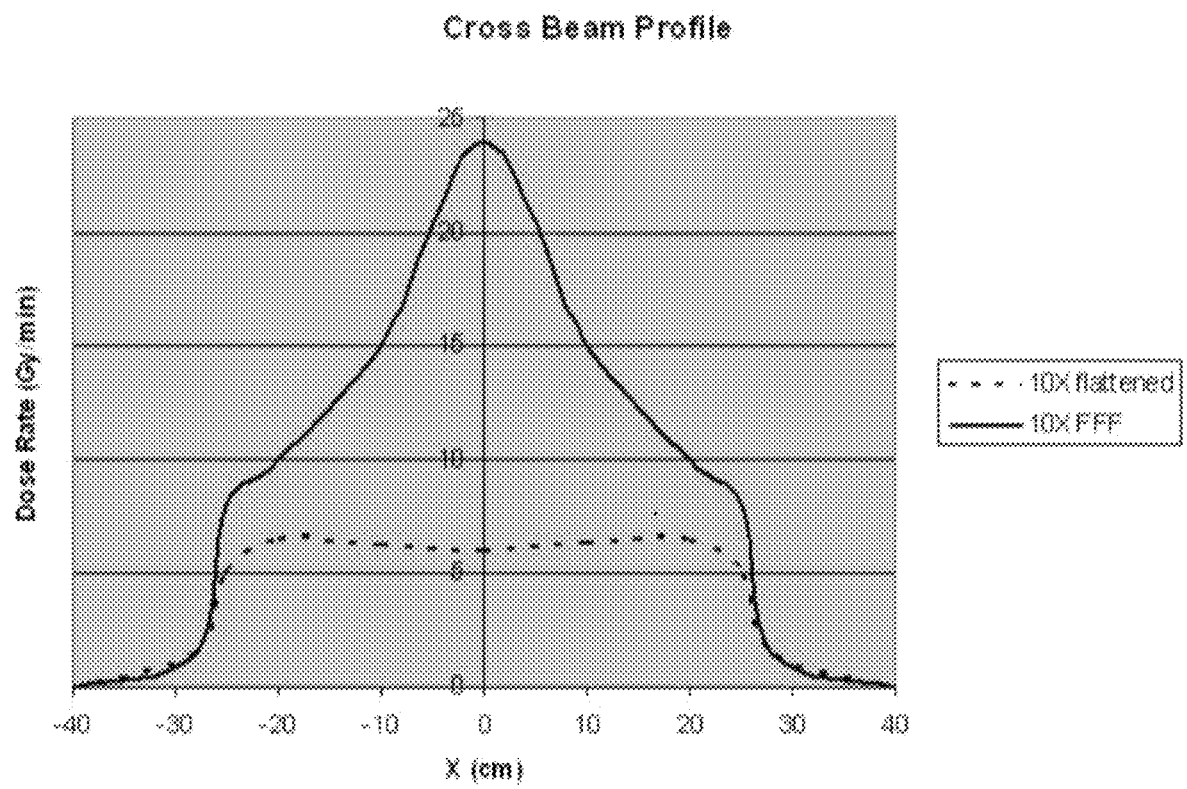
FIG. 1 is a comparison diagram of section curve dose rates of an FFF beam and a flattened beam in the prior art.

A reconstruction method for motion compensated high quality 4D-CBCT image based on bilateral filtering includes the following steps.

Step 1, Collection of 4D-CBCT Projections

Firstly, 4D-CBCT projections are collected. A waveform of amplitudes and phases of the respiratory motion of a patient over time during treatment can be obtained by using an existing mature camera-based respiratory motion detection system. With the collection of the 4D-CBCT projections, each frame of collected projections may be labeled with a corresponding time tag by a monitored respiratory signal. After the completion of the collection of all projections, the CBCT projections with time and amplitude tags of respiratory signals can be subjected to 4D phase segmentation by respiratory amplitude or phase signal, thereby obtaining 4D-CBCT projections.

This step is a data pre-processing procedure. In specific implementation, the 4D-CBCT projections may be obtained using Varian Respiration Positioning Management (RPM) system. The system includes a globular infrared light reflector holder placed on a patient's abdomen and an infrared camera fixed to the ceiling of a treatment room to monitor the motion amplitudes of a globular infrared light reflector. Then, the patient's respiratory amplitude and phase signals over time can be recorded by the infrared camera. The recorded respiratory signals are distributed to the projections inclusive of the patient's respiratory motion collected by the CBCT system, equivalent to labeling each collected projection with the time tag. Subsequently, 4D-CBCT projections can be obtained by 4D grouping of the projections according to the time tags of a respiratory motion curve.

Step 2, Initial 4D-CBCT Image Reconstruction and Initial 4D-DVF Generation

Initial 4D-CBCT reconstruction and initial 4D-DVF generation are carried out using Total Variation (TV) minimization and Demons registration algorithms, respectively.

Firstly, a sequence of initial 4D-CBCT images is reconstructed from the collected 4D-CBCT projections by TV minimization. The TV minimization reconstruction method is adopted because effective noise removal from reconstructed images can be achieved by this approach with image boundaries well retained. The number of projections at each phase is about 50-60 after the 4D phase segmentation of the projections. When initial 4D-CBCT reconstruction is carried out with such sparse projections by the traditional analytical method, strong streak artifacts and extremely poor image quality are caused. The TV minimization method can prevent images from being polluted by the streak artifacts, allowing for further improvement on the quality of subsequent 4D-CBCT images.

After the initial 4D-CBCT images are obtained, initial 4D-DVF at reference phase % versus other 4D phases is generated using Demons registration algorithm. Demons registration algorithm is a classical deformable image registration algorithm based on similarity between image pixel values, which can generate a 3D-DVF between two matching images. The initial 4D-DVF obtained using Demons registration algorithm can be used to trigger further 4D-DVF optimization, thereby being conducive to obtaining the optimized 4D-DVF rapidly.

Step 3, Iterative 4D-DVF Optimization

The DVF between a reference phase 0% image and one of other 4D phases is generated by registration between measured projections of the target phase and the forward projection of the deformed phase 0%. The procedure is as shown by formula (2): $p^t$ represents the measured projections of the target phase. $\mu^0(x+v^{0\to t})$ represents DVF pixel $v^{0\to t}$, causing the phase 0% image $\mu^0$ to be deformed from the reference phase 0% to the target phase t. A forward projection matrix A is added in front of the deformed phase 0% image to obtain the forward projection of the deformed image. $\|p^t - A\mu^0(x+v^{0\to t})\|^2_2$ represents $l_2$ norm of differences between the measured projections of the target phase t and the forward projection of the phase 0% image deformed to the target phase t, namely difference square. This forms the fidelity term of a DVF optimization object function. The design of the penalty term $\beta\varphi(v^{0\to t})$ of the DVF optimization object function focuses on natural DVF smoothing and maintaining of extraction of locally non-uniform sliding motion of a locomotive organ. The specific smoothing term is designed as equation (3). The smoothing term mainly includes three Gaussian filter kernels based on bilateral filtering, namely spatial domain-based Gaussian kernel $G_x$, image pixel domain-based Gaussian kernel $G_\mu$, and DVF domain-based Gaussian kernel $G_v$. During optimization, the effect of the whole bilateral filtering can be adjusted by setting variances corresponding to different Gaussian kernels, such as variance $\sigma_x^2$ corresponding to $G_x$, variance $\sigma_\mu^2$ corresponding to $G_\mu$, and variance $\sigma_v^2$ corresponding to $G_v$. The estimation of the globally uniform motion vector field of the locomotive organ and the capture of the locally nonuniform inverse sliding motion occurring on the surface of the locomotive organ can be eventually enabled based on DVF.

As described above, the DVF between two phases is adjusted by registration between the projections at the target phase and the forward projection of the deformed reference phase. In this process, value assignment for different variances of the bilateral filtering kernels is required. In specific implementation, algorithm verification is firstly performed on a 4D Non-Uniform Rational B-Splines (NURBS)-based Cardiac-Torso (NCAT) phantom in ideal conditions. It was found that the optimal result can be obtained at $\sigma_x=3$ mm. When $\sigma_x$ is too large or too small, DVF would be over-smoothed or no local spatial feature would be captured. For the variance $\sigma_\mu$ on the image pixel domain, let $\sigma_\mu$ be equal to the difference between a mean of pixels at the lung tissue and a mean of pixels in the vicinity of the thoracic wall so as to enable natural transition of image pixels from the thoracic wall to the lung tissue. For the NCAT phantom, $\sigma_\mu=0.03$ mm$^{-1}$ satisfies this condition and the reconstruction result is ideal. Finally, the key is how to determine the suitable variance $\sigma_v$ on the DVF domain. In theory, $\sigma_v$ should be greater than the DVF difference between any two points within the spatial range of $\sigma_x$ unless $\sigma_x$ includes a sudden pixel change region of the thoracic wall. In the sudden pixel change region of the thoracic wall, $\sigma_v$ should be smaller than the DVF pixel difference of this region. Thus, small pixel motions can be filtered out while large pixel motions at the thoracic wall can be retained. To avoid over-segmentation, only large sharp and discontinuous motions (e.g., inverse sliding motion on the surface of a locomotive organ) are set to be retained. By observing clinical patient data, the amount of movement of 10 mm can be relatively regarded as a large sliding motion threshold.

Under this assumption, it was found that a good reconstruction result based on the NCAT phantom data can be obtained at $\sigma_v=2.5$ mm.

On the basis of the verification of the algorithm performance based on the NCAT phantom, the algorithm is further verified using the clinical patient data. Since the clinical data is collected in real environment, there may exist a series of interfering factors including noise, scattering, beam hardening, etc. The corresponding filter kernel variance that fits the characteristics of preliminary clinical data slightly differs from the aforementioned variance that fits the NCAT phantom. It was found that $\sigma_x=3$ mm, $\sigma_\mu=0.02$ mm$^{-1}$ and $\sigma_v=2$ mm can well fit the clinical data, and a good clinical reconstruction result can be obtained.

Iterative optimization estimation of DVF is carried out with the above variances. A non-linear conjugate gradient operator is used in the optimization of the object function, and therefore, the gradient of the object function needs to be calculated. The gradient of the penalty term in the object function is derived as shown by equation (4).

Step 4, Continuously Iterative Updating Reconstruction at Reference Phase %

After each 4D-DVF iteration, updating reconstruction of the reference phase % image is carried out, so that the quality of the reference phase image can be continuously improved. The reconstruction procedure is as described by equation (1), where the DVF pixel $d_{jn}^{0\to t}$ is updated with each 4D-DVF update.

In specific implementation, the optimal estimation of 4D-DVF and the updating of the reference phase % image are carried out alternately. In other words, 4D-DVF is firstly optimized by n iterations (n can be set to 10-20), and a median 4D-DVF at this time is saved. The median 4D-DVF at this time is then substituted into a motion compensated SART algorithm to reconstruct the phase 0% image after the 4D-DVF optimization by n iterations. After next 4D-DVF optimization by n iterations, a second motion compensated SART reconstruction is carried out to obtain the phase 0% image after the second update. After each iterative 4D-DVF optimization, the value of the object function at each phase is recorded. After the mth motion compensated SART reconstruction iteration, if the 4D-DVF optimization object function at each phase trends to converge, the overall 4D-DVF optimization and motion compensated SART reconstruction would be stopped. Moreover, the current optimal 4D-DVF and a high quality phase 0% CBCT image obtained by m motion compensated SART reconstructions are saved.

Step 5, Generation of a Sequence of Final High Quality 4D-CBCT Images

As the object function decreases continuously and eventually trends to be stable during 4D-DVF optimization, the reference phase 0% image reconstructed by continuous iterations is deformed with the resulting optimized 4D-DVF. A sequence of high quality 4D-CBCT images is finally obtained. The whole procedure is as shown by equation (5).

Figure 2:
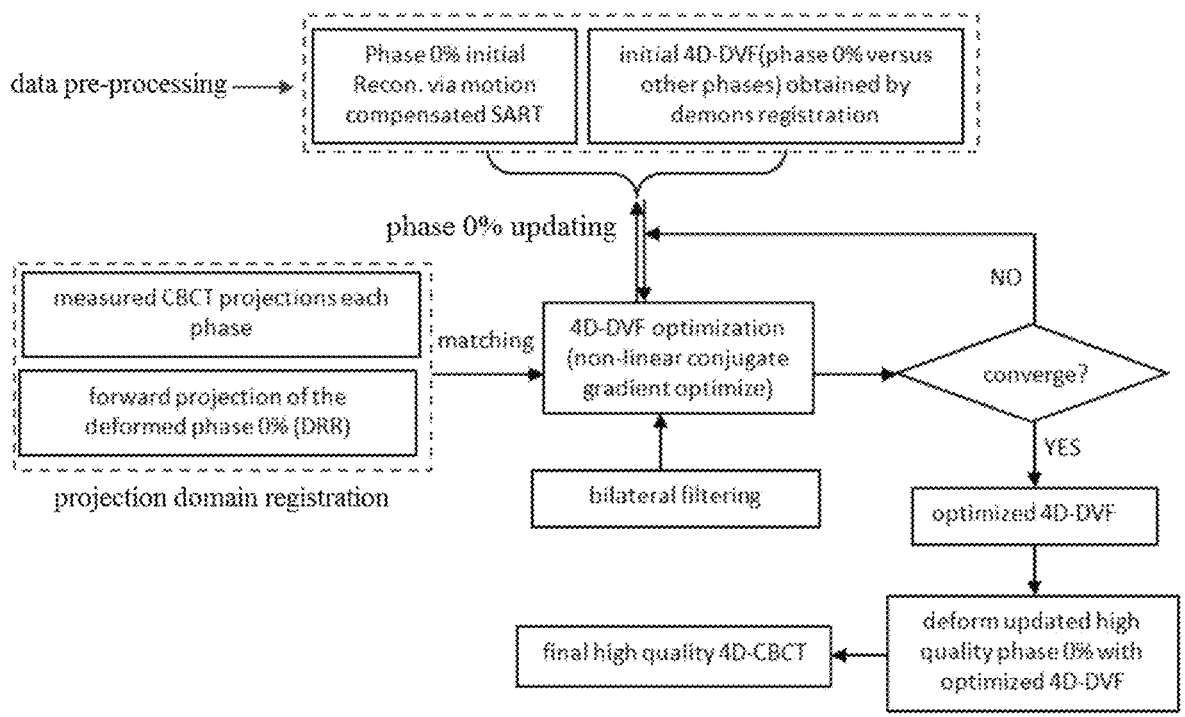
FIG. 2 is a block diagram of a technical route of motion compensation for high quality 4D-CBCT based on bilateral filtering.

The block diagram of the technical route of the above steps is as shown in FIG. 2.

EXAMPLE 1

The validity of the algorithm was verified on the 4D NCAT phantom first. The respiration period of the 4D phantom was 4 seconds. The superior internal (SI) motion at the edge of the thoracic diaphragm had a maximum of 20 mm, and the anteroposterior (AP) motion in the chest had a maximum of 12 mm. The phantom had ten phases, and 20 projections were simulated at each phase for DVF estimation and 4D-CBCT reconstruction. The phantom image size was set to 256*256*150, and the voxel size was set to 1*1*1 mm$^3$. The projection size was set to 300*240*20, and the projection voxel size was set to 1*1*1 mm$^3$.

Figure 3:
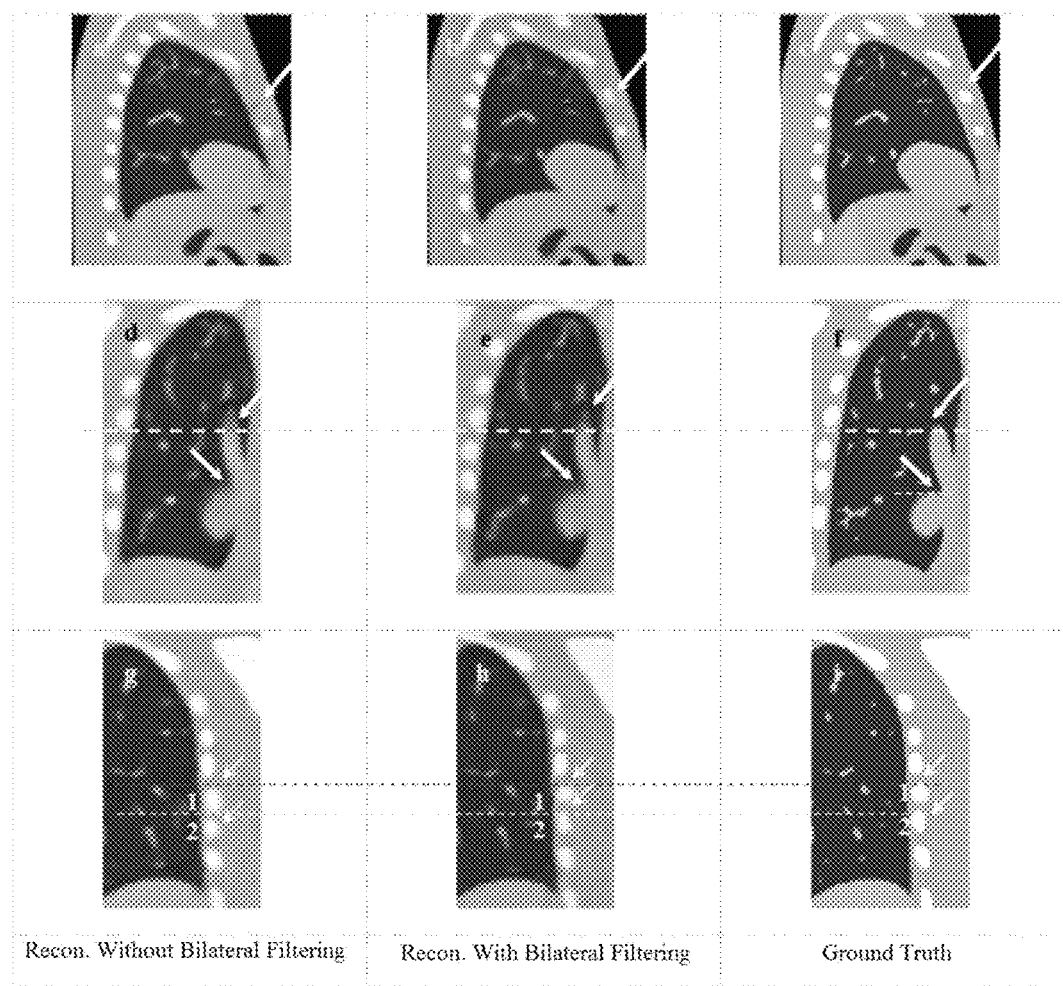
FIG. 3 is a comparison diagram of reconstruction results of 4D Non-Uniform Rational B-Splines (NURBS)-based Cardiac-Torso (NCAT) phantoms.

FIG. 3 shows a reconstructed image of phase 40% with and without sliding motion constraint. FIG. 3(a) shows reconstructed sagittal images of phase 40% without bilateral filtering; FIG. 3(b) shows a reconstructed identical sagittal slice with bilateral filtering; FIG. 3(c) shows the phantom ground truth; and FIG. 3(d), FIG. 3(e) and FIG. 3(f) show the Region Of Interest (ROI), where sliding motions occurred at the edges of the heart and the veins. ROI showed clear boundaries of the edges of the heart (indicated by the arrows in figures (d), (e) and (f)) obtained with bilateral filtering. In addition, the veins (marked with yellow dotted lines) were reconstructed more accurately with bilateral filtering (for example, the length of the veins was reconstructed better). FIG. 3(g), FIG. 3(h) and FIG. 3(i) show the difference between reconstructions of ribs with and without bilaterally filtering. In FIG. 3(h), the top edges 1 and 2 of the ribs were matched with the reference positions of the ribs in the ground truth as shown in FIG. 3(i), and bilateral filtering was omitted in FIG. 3(g).

Figure 4:
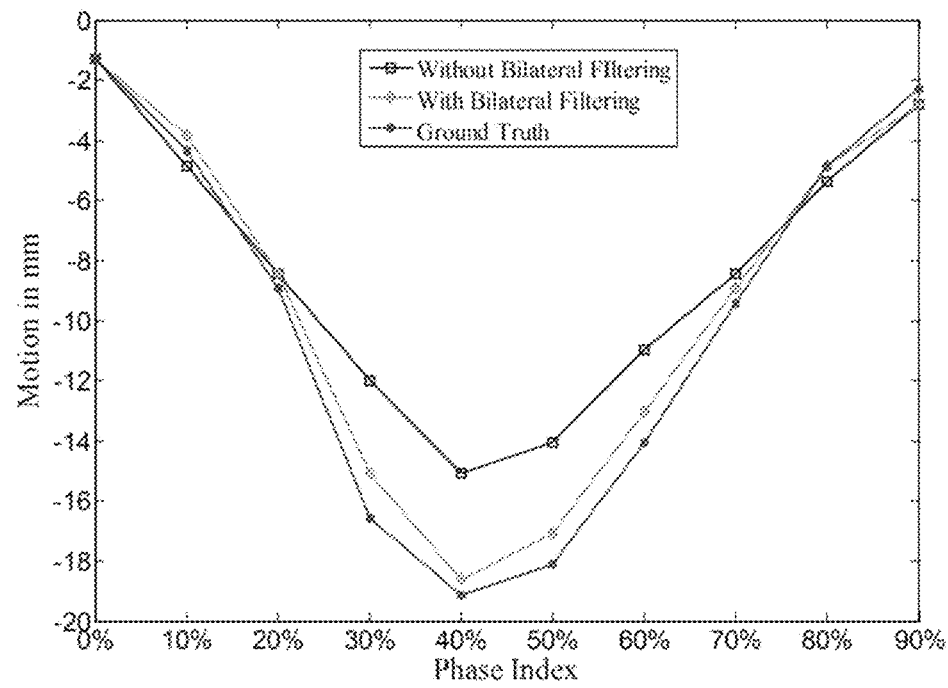
FIG. 4 is a comparison diagram of reconstruction results of 4D motion trajectory (in z-axis direction) in ROI of NCAT phantom.

To detect motion errors caused by sliding motion images at the boundaries of a locomotive organ, a 4D motion trajectory in z-axis direction was extracted from the edge of the heart in the above figure (see the dotted line at the marked position in FIG. 3(f)). In each 4D image, the correspondingly detected dotted line positions were used for motion trajectory rendering. FIG. 4 shows that the trajectory extracted with consideration of sliding based on bilateral filtering was much better in degree of matching with the 4D trajectory ground truth than the trajectory with no consideration of this factor. Root Mean Square Error (RMSE) and Maximum motion Error (MaxE) were calculated with each motion from the trajectory. RMSE was defined as follows:

$$RMSE = \sqrt{\frac{1}{9} \times \sum_{ph=1}^{9} (pos_{ph}^R - pos_{ph}^T)^2} \qquad (7)$$

where $pos_{ph}^R$ represents a feature structure position in the ph$^{th}$ phase image in the reconstructed image; $pos_{ph}^T$ represents the position of the same feature structure in the corresponding phase in the ground truth image; ph represents a phase index; and there were 10 4D phases here. MaxE was the maximum error among the 10 phases.

The results showed that based on the result of bilateral filtering, the RMSE and MaxE of the 4D trajectory were 0.796 mm and 1.02 mm, respectively. Compared with the result of original reconstruction without bilateral filtering, the RMSE and MaxE of the trajectory were 2.704 mm and 4.08 mm, respectively.

A preliminary clinical patient data test was carried out on the basis of the data of the NCAT phantom. CBCT projections of two patients with lung cancer were collected, and a preliminary test was performed on the sliding compensated 4D-CBCT reconstruction algorithm based on bilateral filtering. To find out the ground truth for the clinical data, quantitative comparison was carried out and the clinical ethics permission by Institutional Review Board (IRB) was submitted. The data of each patient was projections collected in a full fan mode. The scanning time was 4-6 minutes. About 2000 projections were obtained. The obtained projections were divided into 10 phases using corresponding Respiration Positioning Management (RPM) signals during collection. Division in this way resulted in averagely about 200 projections at each phase, and a high quality 4D-CBCT image was reconstructed using the TV minimization reconstruction technique, which could be used as a reference image for clinical result quantification. This would be not allowed under the conventional clinical scan protocol. The purpose was merely to collect sufficient projections, ensuring that the 4D phase segmentation could result in sufficient projections at each phase to enable reconstruction of a high quality 4D-CBCT clinical data image as reference for clinical effect evaluation and verification on the algorithm.

In consideration of only about 670 projections collected at most by rotation of 360 degrees under one-minute CBCT scan protocol in clinical practice and actually only about 60 projections at each 4D phase after 4D phase segmentation, All the collected 4D projections were undersampled so as to simulate the real one-minute CBCT scan scenario. In other words, the average projections at each phase were undersampled to about 40. Subsequently, a series of parallel control 4D-CBCT reconstructions were obtained using different reconstruction methods and then compared with the proposed motion compensated reconstruction based on bilateral filtering. The used reconstruction methods were traditional Feldkamp-David-Kress (FDK) reconstruction, TV minimization reconstruction, and reconstruction with no consideration of sliding motion modeling in algorithm.

Figure 5:
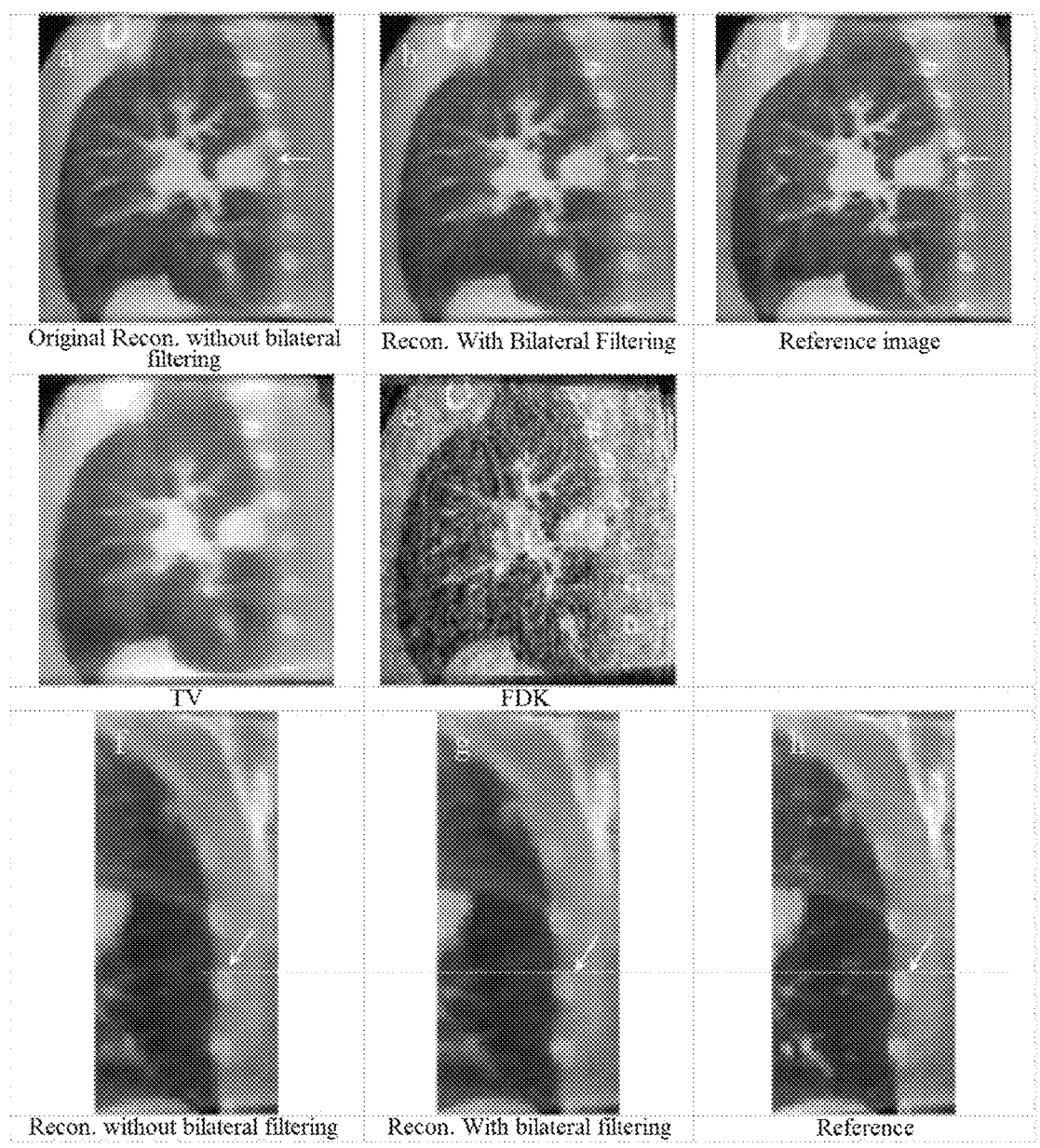
FIG. 5 is a diagram of verification results of algorithm with clinical patient data.

Respective results were shown in FIG. 5. FIG. 5(a) and FIG. 5(b) show sagittal images of reconstruction results for the first patient with/without sliding motion constraint based on bilateral filtering. FIG. 5(c) shows a patient reference image reconstructed from all sampled projections by television. As indicated by arrows, there was a tumor next to the thoracic wall with a small hole between the tumor and the thoracic wall. Compared with the reference in FIG. 5(c), the small cavity in FIG. 5(a) was apparently obscure. Compared with the control, the boundary of the tumor as shown in FIG. 5(b) was more apparent than that shown in FIG. 5(a). This indicated that more comparable reference results were obtained by reconstruction based on bilateral filtering than by reconstruction without bilateral filtering. For the sake of comprehensive comparison, FIG. 5(d) and FIG. 5(e) show respective reconstructed slices by TV minimization and FDK methods, respectively. The two results indicated that the structure in the image reconstructed by TV minimization was over-smoothed, and the content in the FDK image was seriously worsened by noise pollution.

On the other hand, FIG. 5(f), FIG. 5(g) and FIG. 5(h) show the boundary of the pulmonary rib cage of this patient, thus allowing for comparison of rib motions. The dotted line indicates the upper edge position of the rib. As indicated by arrows, in reconstruction without bilateral filtering (such as FIG. 5(f), the top edge of the rib was slightly shifted upwards by about 2 mm in FIG. 5(f) compared with the bilaterally filtered reconstruction result (FIG. 5(f)) and the reference rib position in the patient reference image FIG. 5(h). Therefore, the real position of the rib in the reconstructed image was well corrected by bilateral filtering.

Figure 6:
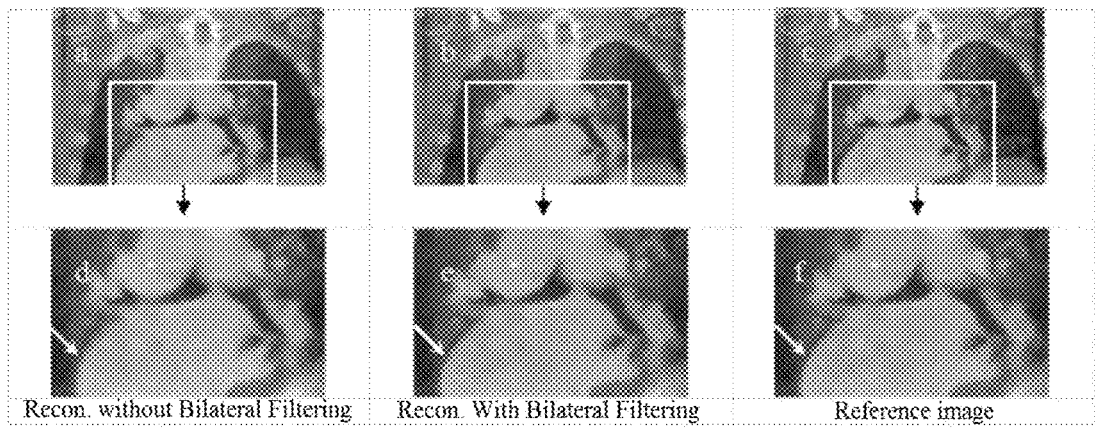
FIG. 6 is a comparison diagram of reconstruction results from clinical data of a second case.

FIG. 6 shows a coronal image reconstructed from the clinical data of the second patient. FIG. 6(a) shows an original motion compensated reconstructed image without bilateral filtering. FIG. 6(b) shows a bilaterally filtered reconstruction result. FIG. 6(c) shows a clinical patient reference image reconstructed from all projections by TV minimization. FIG. 6(d), FIG. 6(e) and FIG. 6(f) show zoomed-in ROIs (see ROI box in FIG. 6(a)) at the same position in FIG. 6(a), FIG. 6(b) and FIG. 6(c), respectively.

It was clearly indicated that the cardiopulmonary boundary (marked by the arrow) was clearer than that in FIG. 6(d), as compared with FIG. 6(f). This further proved the advantage of bilateral filtering, that is, more accurate reconstruction results can be obtained as compared with original motion compensated results.

Figure 7:
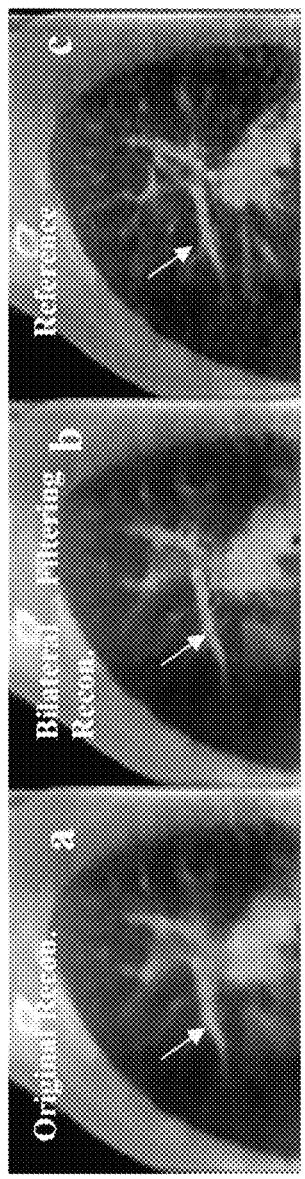
FIG. 7 is a comparison diagram of reconstruction results from clinical data of a third case.

FIG. 7 shows comparison of reconstruction results for a third patient. Images were reconstructed of phase 40% for the third patient. As shown in the figure, (a) was original reconstruction without bilateral filtering; (b) was a bilaterally filtered reconstruction result; and (c) was a reference for the patient. The results showed that the fiber like structure indicated by yellow arrows could be more apparent by bilaterally filtered reconstruction than by original reconstruction, as compared with the reference for the patient.

Numerical values of quantitative analysis of relative reconstruction errors caused by 1) traditional FDK reconstruction method, 2) TV minimization reconstruction method, 3) original motion compensated reconstruction method with no consideration of sliding motion modeling and 4) bilaterally filtered sliding motion compensated reconstruction method with three pieces of clinical data, respectively, were summarized in table 1. The results showed the reconstruction error caused by the proposed bilateral filtering method was smallest.

TABLE 1

Comparison of Relative Errors of Reconstructions from Clinical Data

| RE | FDK | TV | Original Recon | Bilateral Filtering Recon |
|---|---|---|---|---|
| Patient 1 | 29.63% | 9.88% | 7.05% | 6.61% |
| Patient 2 | 30.55% | 9.01% | 7.68% | 7.06% |
| Patient 3 | 30.45% | 8.85% | 7.21% | 7.10% |

Finally, it should be noted that the above examples are only intended to explain, rather than to limit, the technical solution of the present disclosure. Although the present disclosure is described in detail with reference to the preferred examples, those ordinarily skilled in the art should understand that modifications or equivalent substitutions may be made to the technical solution of the present disclosure without departing from the spirit and scope of the technical solution of the present disclosure, and such modifications or equivalent substitutions should be included within the scope of the claims of the present disclosure.

What is claimed is:

1. A reconstruction method for motion compensated high quality four-dimensional (4D)-Cone Beam Computed Tomography (CBCT) image based on bilateral filtering, the method allowing for exact modeling reconstruction for an inverse sliding motion on a surface of a locomotive organ and comprising the following steps:

building a motion compensated three-dimensional (3D)-CBCT reconstruction model based on a simultaneous algebraic reconstruction technique (SART) to reconstruct a high quality CBCT image of a reference phase, the reference phase being phase 0%;

creating an iterative optimization procedure and estimating a 4D Deformable Vector Field (DVF) model between phase 0% and each other 4D phase image, thereby obtaining an exact 4D-DVF inclusive of the inverse sliding motion on the surface of the locomotive organ; and successively deforming the high quality phase 0% image in accordance with an optimized 4D-DVF to obtain a sequence of final high quality 4D-CBCT images; wherein DVF at each 4D phase is optimized by an algorithm that generates the optimized DVF by registration between 1) measured projections of the phase and 2) simulated forward projection of a reference phase 0% image deformed to the phase; an energy function used in DVF optimization by projection registration is as follows:

$$f_1(v^{0\to t}) = \|p^t - A\mu^0(x+v^{0\to t})\|^2_2 + \beta\varphi(v^{0\to t})$$

$$f_2(v^{t\to 0}) = \|p^0 - A\mu^t(x+v^{t\to 0})\|^2_2 + \beta\varphi(v^{t\to 0})$$

$$s.t. v^{0\to t}(x+v^{t\to 0}) + v^{t\to 0} = v^{t\to 0}(x+v^{0\to t}) + v^{0\to t} = 0$$

wherein $f_1$ and $f_2$ represent symmetric inverse continuous energy functions, with the superscript 0 representing phase 0% and the superscript t representing other phase t; A is a matrix for providing a forward projection of the deformed phase 0% image; $v^{0\to t}$ represents a forward DVF; $v^{t\to 0}$ represents an inverse DVF; $\|p^t - A\mu^0(x+v^{0\to t})\|^2_2$ and $\|p^0 - A\mu^t(x+v^{t\to 0})\|^2_2$ are data fidelity terms; $\varphi(v^{0\to t})$ and $\varphi(v^{t\to 0})$ are corresponding normalization terms; the inverse continuity of DVF is guaranteed by the third row in the above equations; the smoothness of the smoothing term is controlled by $\beta$; and taking modeling of inverse sliding motions on surfaces of locomotive organs into consideration, $\varphi(v)$ is defined as:

$$\varphi(v) = \sum_{v\in R^3} \sum_{i=1}^{3} \sum_{j=1, y_j\in N(x_j)}^{3} \left( G_x(x_j, y_j, \sigma_x^2) \cdot G_\mu(\mu^t(x_j), \mu^t(y_j), \sigma_\mu^2) \cdot G_{v_i}(v_i(x_j), v_i(y_j), \sigma_v^2) \left(\frac{\partial v_i}{\partial x_j}\right)^2 \right)$$

where $$\frac{\partial v_i}{\partial x_j}$$

represents the difference of a neighborhood of each voxel in DVF, j represents a latitude index of the voxel in the image, and i represents an index of the DVF along the three directions of x, y, and z; specific forms of three sub-filter kernels are as follows:

$$G_x(x_j, y_j, \sigma_x^2) = \exp\left(-\frac{(x_j-y_j)^T(x_j-y_j)}{2\sigma_x^2}\right)$$

$$G_\mu(\mu^t(x_j), \mu^t(y_j), \sigma_\mu^2) = \exp\left(-\frac{\|\mu^t(x_j)-\mu^t(y_j)\|^2}{2\sigma_\mu^2}\right)$$

$$G_{v_i}(v_i(x_j), v_i(y_j), \sigma_v^2) = \exp\left(-\frac{(v_i(x_j)-v_i(y_j))^T(v_i(x_j)-v_i(y_j))}{2\sigma_v^2}\right)$$

$G_x$ is the Gaussian kernel on the spatial domain with the variance of $\sigma_x^2$—; $G_\mu$ is another image domain based Gaussian kernel with the variance of $\sigma_\mu^2$; $G_v$ is the DVF domain Gaussian kernel with the variance of $\sigma_v^2$; '$x_j$' is the kernel's center voxel location, and '$y_j$' is the neighborhood voxel locations within $$N(x_j); \frac{\partial v_i}{\partial x_j}$$

represents a difference of a neighborhood of each voxel in DVF; the gradient $\nabla\varphi(v)|_v$ is calculated within the 3×3×3 neighborhood surrounding each voxel of interest; the gradient of $\varphi(v)$ is given by:

$$\nabla\varphi(v) = \sum_{v\in R^3} \sum_{i=1}^{3} \sum_{j=1, y_j\in N(x_j)}^{3} (G_x(x_j, y_j, \sigma_x^2) \cdot G_\mu(\mu^t(x_j), \mu^t(y_j), \sigma_\mu^2) \cdot G_v(v_i(x_j), v_i(y_j), \sigma_v^2)(v_i(x_j) - v_i(y_j))).$$

2. The reconstruction method for motion compensated high quality 4D-CBCT image based on bilateral filtering according to claim 1, wherein during modeling in step 1, the optimized 4D-DVF between phase 0% and other 4D phases is substituted into the SART reconstruction procedure to obtain an improved motion compensated SART algorithm, thereby obtaining a high quality phase 0% initial image based on all 4D projections; and a mathematical model of motion compensated SART is described below:

letting $p^t = (p_1^t, p_2^t, \ldots, p_I^t)$ represent a logarithmically compressed line integral of 4D-CBCT projections of phase t and $\mu^t = (\mu_1^t, \mu_2^t, \ldots, \mu_J^t)$ represent an attenuation coefficient for a phase t image; and the mathematical model of motion compensated SART is expressed as:

$$\mu_j^{0,(k+1)} = \mu_j^{0,(k)} + \frac{\sum_{jn} d_{jn}^{t\to 0} \sum_i \left[ a_{in} \frac{p_i^t - \sum_n a_{in}\mu_n^{t,(k)}}{\sum_{n=1}^{J} a_{in}} \right]}{\sum_i a_{in}}$$

wherein k is the number of iterations; j is a voxel index for the phase 0% image; n is a voxel index for the phase t image; $a_{in}$ is an intersection length of forward projection simulation i with image voxel n, which is obtained by Digitally Reconstructed Radiograph (DRR); $d_{jn}^{t\to 0}$ represents an inverse DVF for deforming the phase t image to phase 0; introducing DVF reflects the idea of motion compensation; and the phase 0% initial image $\mu_j^{0,(0)}$ is obtained via Total Variation (TV) minimization reconstruction.

3. The reconstruction method for motion compensated high quality 4D-CBCT image based on bilateral filtering according to claim 1, wherein on the basis of the high quality phase 0% CBCT image and the optimized 4D-DVF thus obtained, a sequence of final high quality 4D-CBCT images is obtainable by deforming the phase 0% image; and the mathematical description of this procedure is presented below:

$$\mu_n^{t,(k)} = \Sigma_j d_{jn}^{0\to t} \mu_j^{0,(k)}$$

wherein $\mu_n^{t,(k)}$ represents that a phase t CBCT image is obtainable by deforming $\mu_j^{0,(k)}$ using 4D-DVFs, i.e., $d_{jn}^{0 \to t}$.

\* \* \* \* \*